Patented Mar. 17, 1925.

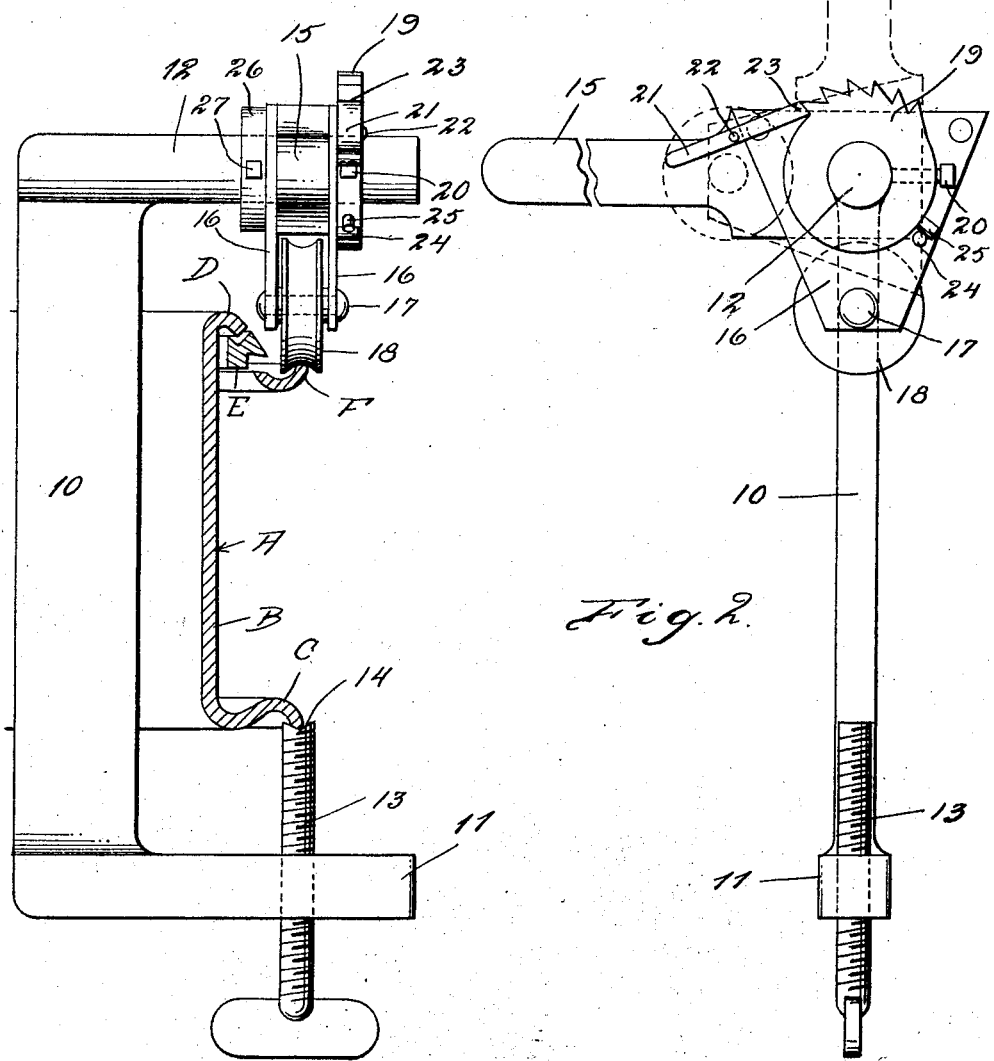

1,530,265

UNITED STATES PATENT OFFICE.

SAMUEL D. HUEY, OF BUTLER, PENNSYLVANIA.

TIRE-REMOVING TOOL.

Application filed September 19, 1923. Serial No. 663,644.

*To all whom it may concern:*

Be it known that I, SAMUEL D. HUEY, a citizen of the United States, residing at Butler, in the county of Butler and State of Pennsylvania, have invented certain new and useful Improvements in Tire-Removing Tools, of which the following is a specification, reference being had to the accompanying drawings.

This invention relates to tools for use by automobile mechanics and others engaged in tire changing and has for its object the provision of a novel tool for use on three section rims whereby to compress one member or section of the rim to permit removal of the locking ring so that the tire may be removed, the rims referred to being of that type carrying pneumatic tires.

An important and more specific object is the provision of a tool designed to be straddlingly engaged upon the rim and including a movably mounted lever carrying a roller adapted to engage and move a section of the rim, means being provided for holding the parts in position and to prevent return of the lever to initial position.

An additional object is the provision of a device of this character which is adjustable for use on rims of different sizes and which will moreover be simple and inexpensive in manufacture, efficient and rapid in use, durable in service, and a general improvement in the art.

With the above and other objects and advantages in view, the invention consists in the details of construction to be hereinafter more fully described and claimed, and illustrated in the accompanying drawings in which:

Figure 1 is an elevation of the tool showing it engaged upon a rim, the rim being in section and the tool being shown in its operated position with a portion of the rim contracted;

Figure 2 is an elevation at right angles to Figure 1 showing by dotted lines the initial position of the lever and by full lines the position shown in Figure 1.

Referring more particularly to the drawings, the letter A represents a rim of that type including a main or body portion B provided at one edge with a tire retaining flange C and provided at its opposite edge with a smaller flange D engaged by a locking ring E held against displacement by a tire engaging flange F. This is the type of rim for which the present tool is designed and it is well known that a rim of this character must have a section F compressed or moved toward the flange C to permit removal of the locking ring E so that the tire may be removed.

In carrying out my invention I provide a U-shaped frame 10 including an arm 11 and a second arm 12, the former being rectangular in cross section and the latter being reduced to cylindrical form. This frame is of sufficient size to be straddlingly engaged upon a rim A of the maximum size used.

Threaded through the arm 11 is an adjusting screw 13 preferably of the wing type which has its end formed with a V-shaped notch 14 which will facilitate its engagement with the edge of the flange C as shown in Figure 1.

The numeral 15 represents an elongated lever which is formed with a hole and rotatably engaged upon the frame arm 12. Secured upon opposite sides of this lever are plates 16 between which is journaled, at 17, a grooved roller 18 which is adapted to be engaged upon the edge of the flange F.

For holding the lever in swung position with the flange F under tension, I provide a ratchet 19 which is mounted on the arm 12 and locked thereon by a set screw 20. Co-operating with this ratchet is a pawl 21 pivoted at 22 on one side of the lever and having its active end 23 adapted to engage the ratchet, the particular tooth engaged depending upon the final position of the lever.

For preventing the lever from swinging beyond a certain extent, I provide a stop pin 24 which projects from one of the plates 16 and which is engageable with a similar pin 25 projecting from the periphery of the ratchet. It is to be observed that the ratchet is not toothed throughout its periphery as such would be unnecessary as only a comparatively small number of teeth must be provided.

While it is not essential I prefer to equip the arm 12 with a stop collar 26 bearing against the lever and held in place by a set screw 27, the purpose being to prevent the lever from moving away from the ratchet.

In use the frame 10 is straddlingly engaged upon the rim A as shown in Figure 1 and the screw 13 is adjusted so that its notched end 14 will engage the flange C while the roller 18 will engage the flange F when the lever 15 is in its initial position co-extensive with the frame 10, as shown by dotted lines in Figure 2. The operator then grasps the lever and swings it in the direction of the arrow in Figure 2 whereupon the roller 18 bearing upon the flange F will compress the same or move it toward the flange C and out of engagement with the locking ring E which may then be removed. When the lever is thus swung, the pawl or latch 21 will engage one of the teeth of the ratchet 19 and this will naturally hold the lever against return movement to its initial position. The reverse operation is followed when the tire is replaced upon the rim.

From the foregoing description and a study of the drawing it will be apparent that I have thus provided a simply constructed and inexpensive tool which will be a great time and labor saver in replacing pneumatic truck tires. A powerful leverage is provided so that very little effort will be required in the manipulation of the tool. A distinct feature of advantage is the adjusting screw 13 which permits the device to be used on rims of widely different sizes. Owing to the fewness of the parts, it is apparent that there is very little to get out of order so that the device should have a long life and saisfactorily perform all of its functions.

While I have shown and described the preferred embodiment of the invention, it is, of course, to be understood that I reserve the right to make such changes in the form, construction and arrangement of parts as will not depart from the spirit of the invention or the scope of the subjoined claim.

Having thus described my invention, I claim:

In a tire removing tool, a U-shaped frame adapted to be straddled upon a wheel rim from the inner periphery thereof whereby the arms of the frame will extend radially with respect to the rim, a screw threaded through one arm of the frame and engageable with one edge of the rim, a lever rotatably mounted on the other arm of the frame and movable in a plane parallel with the axis of the rim, a collar on the said second named arm, a ratchet on the second named arm spaced from the collar, the collar and ratchet operating to prevent displacement of the lever longitudinally of the second named arm, means for holding the collar and ratchet at a selected position whereby the location of the lever with respect to the bight portion of the frame may be varied, a roller carried by the lever engageable with the other edge of the rim, and a pawl on the lever co-operating with said ratchet.

In testimony whereof I hereunto affix my signature.

SAMUEL D. HUEY.